(12) United States Patent
Connard et al.

(10) Patent No.: US 11,190,353 B2
(45) Date of Patent: Nov. 30, 2021

(54) COMPUTER IMPLEMENTED METHODS AND SYSTEMS FOR MANAGING A CRYPTOGRAPHIC SERVICE

(71) Applicants: Atlassian Pty Ltd., Sydney (AU); Atlassian Inc., San Francisco, CA (US)

(72) Inventors: David Connard, Sydney (AU); Rahul Ranjan, Sydney (AU); Florian Ruechel, Sydney (AU); Thomas Leslie Knight, Sydney (AU); Martinus Gerardus Johannes Verbruggen, Sydney (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/830,436

(22) Filed: Mar. 26, 2020

(65) Prior Publication Data

US 2021/0306150 A1    Sep. 30, 2021

(51) Int. Cl.
*H04L 9/32* (2006.01)
*H04L 9/08* (2006.01)

(52) U.S. Cl.
CPC .......... *H04L 9/0891* (2013.01); *H04L 9/0819* (2013.01)

(58) Field of Classification Search
CPC ............. H04L 2463/062; H04L 63/068; H04L 63/0428; H04L 63/06; H04L 9/0819; H04L 9/0891; G06F 2221/2107
USPC ........................................................ 713/171
See application file for complete search history.

(56) References Cited

U.S. PATENT DOCUMENTS

| 7,392,378 | B1 * | 6/2008 | Elliott | H04L 63/0428 380/277 |
|---|---|---|---|---|
| 8,407,484 | B2 * | 3/2013 | Neble | G06F 21/10 380/265 |
| 8,584,216 | B1 * | 11/2013 | Allen | H04L 9/0836 380/277 |
| 9,882,879 | B1 * | 1/2018 | Dotan | H04W 12/06 |
| 2010/0027796 | A1 * | 2/2010 | Robert | G11B 20/00086 380/255 |
| 2012/0308001 | A1 * | 12/2012 | Arnold | H04L 9/0877 380/44 |
| 2016/0182470 | A1 * | 6/2016 | Rubin | H04L 63/102 713/168 |

(Continued)

OTHER PUBLICATIONS

Bjorkqvist et al., Scalable Key Management for Distributed Cloud Storage, IEEE, Apr. 20, 21018, pp. 250-256. (Year: 2018).*

(Continued)

*Primary Examiner* — Luu T Pham
*Assistant Examiner* — Jenise E Jackson
(74) *Attorney, Agent, or Firm* — Brownstein Hyatt Farber Schreck, LLP

(57) ABSTRACT

The present invention relates to a computer implemented method, software product and computer system for managing a cryptographic service. The computer implemented method comprises: establishing a pool of encryption materials; periodically updating the pool of encryption materials; and responsive to an encryption request from an encrypting application: selecting encryption materials from the pool; encrypting payload data included in the encryption request using the selected encryption materials; and returning encrypted payload data to the encrypting application.

20 Claims, 8 Drawing Sheets

(56) References Cited

U.S. PATENT DOCUMENTS

| | | | | |
|---|---|---|---|---|
| 2018/0123791 A1* | 5/2018 | Ness | .................. | H04L 63/0823 |
| 2018/0139047 A1* | 5/2018 | Woods | ................ | G06K 9/6256 |
| 2018/0176187 A1* | 6/2018 | Davis | ................ | H04L 63/0853 |
| 2018/0294975 A1* | 10/2018 | Woods | .................. | G06F 21/602 |
| 2019/0318102 A1* | 10/2019 | Araya | .................... | H04L 9/088 |
| 2020/0036747 A1* | 1/2020 | Humphries | ......... | G06F 21/6218 |

OTHER PUBLICATIONS

Zhang et al., A Novel Dynamic Key Management, IEEE, Oct. 1, 2003, pp. 391-395. (Year: 2003).*

Ding et al., Model-Driven Application-Level Encryption for the Privacy of E-Health Data, Feb. 18, 2010, IEEE, pp. 341-346. (Year: 2010).*

* cited by examiner

COMPUTER IMPLEMENTED METHODS AND SYSTEMS FOR MANAGING A CRYPTOGRAPHIC SERVICE

TECHNICAL FIELD

The present disclosure is directed to cryptographic services. More specifically, the present disclosure is directed to a distributed cryptographic service providing secure and fault-tolerant encryption and decryption support.

BACKGROUND

Good cybersecurity practice dictates that data be stored in encrypted form. This is the case for both locally stored data and data stored on remote 'cloud' services. Most cryptographic operations employ keys, the secure management of which is of paramount importance. Some cloud service providers offer key management services (KMS) for this purpose. A KMS typically includes functions to generate, exchange, store, use, destroy and replace cryptographic keys. These KMS functions can generally be used to perform cryptographic operations both from within a locally executing application or to control the encryption of data stored in the remote cloud service.

The keys in a KMS are typically logical entities that represent one or more key versions that contain the cryptographic material used to encrypt and decrypt the requisite data. When used in a cryptographic algorithm, a key specifies how to transform plaintext into ciphertext during encryption and how to transform ciphertext into plaintext during decryption. A KMS generally provides for two types of encryption keys: a master encryption key and a data encryption key. After a user has created a master encryption key using the KMS, the user can then use an API to generate data encryption keys that the KMS returns to the user.

The overall computer system resources of some cloud storage services are divided into multiple independent regions, with a separate KMS typically serving each region. For reasons such as resilience, latency and availability, some users decide to distribute data and resources across multiple regions. Encrypting such data requires a cryptographic key that is backed by each region's KMS. However, access to such data can be delayed even when only a single KMS is unavailable, as the user cannot retrieve a cryptographic key that is backed by all of the KMSs where the data was encrypted.

Figure 1:
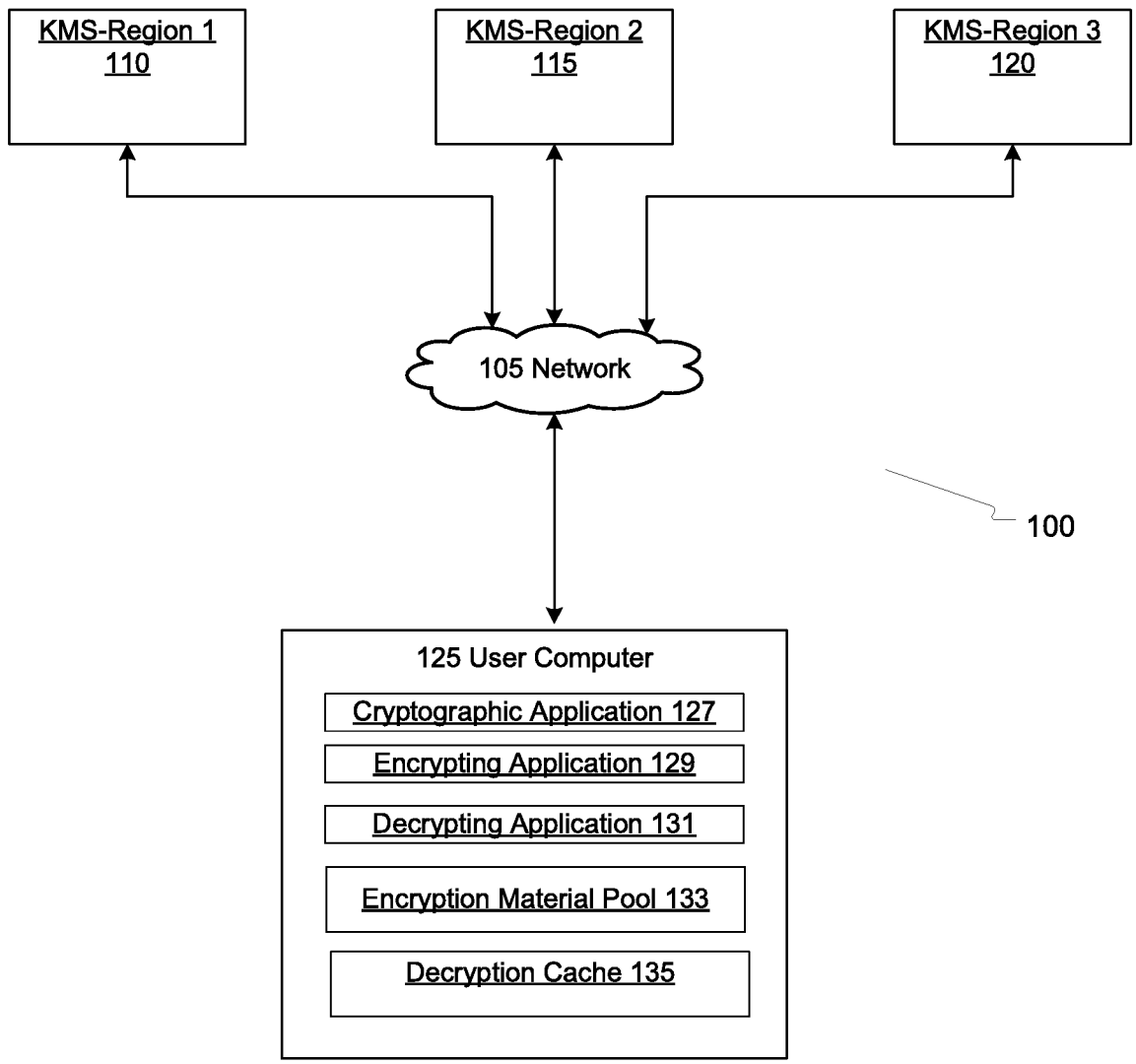
FIG. 1 is a block diagram of a cryptosystem according to an embodiment of the present disclosure.

While the invention as claimed is amenable to various modifications and alternative forms, specific embodiments are shown by way of example in the drawings and are described in detail. It should be understood however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

Cryptosystem

FIG. 1 provides an example distributed cryptosystem 100, and the embodiments will be described with reference to this architecture. However, it will be realized that the teachings of this disclosure could readily be applied to implement a cryptosystem on different kinds of architectures. For example, the cryptosystem need not be distributed and could alternatively be implemented on a single device or on a plurality of locally connected devices.

Distributed cryptosystem 100 comprises a plurality of key management services (KMSs) 110, 115 and 120, each of which serves a cloud storage service (not shown) at a distinct geographic region. Three KMSs are illustrated, although more or fewer are possible. The cloud storage service is utilized by individual and enterprise users to upload, store and retrieve personal and/or business data. Data storage services are exposed to end users through APIs that are used in applications that the end users develop. The APIs are typically Restful APIs to provide standardized access to stored resources.

KMSs 110, 115 and 120 provide functionality for the centralized creation and management of the cryptographic keys that are used to encrypt and decrypt data that is stored in the cloud storage service that the KMS serves. KMSs typically provide at least two categories of encryption keys, namely data keys and master keys. Data keys are used for actual data encryption and decryption. Master keys provide an additional layer of security by encrypting data keys after they have been generated (typically) in plaintext form. Each plaintext data key can usually be encrypted under one or more master keys.

Master keys are represented in some KMSs as logical entities known as 'customer master keys' (CMK). A CMK includes relevant metadata pertaining to the master key such as the key ID, creation date, description and key state. The CMK also contains the key material that is used to actually encrypt and decrypt data.

CMKs are created within each KMS. For security reasons, some categories of CMK (typically symmetric keys and the private key component of an asymmetric key pair) only leave the KMS in encrypted from. This is in contrast to data keys that are used outside of the KMS and thus typically have fewer restrictions on their generation and use. The use of data keys is also generally not tracked by the KMS.

In some cases, the KMSs 110, 115 and 120 provide encryption key services transparently to end users, hiding the details of the master and data keys and instead exposing only high-level encryption and decryption operations that can be called in the end user's applications.

Other details of the KMSs have been omitted as they are not necessary for a complete description of the present disclosure. It will also be realized that the present disclosure can be implemented using alternatives to the described KMSs.

Cloud storage service 102 and KMSs 110, 115 and 120 are communicatively coupled to one another by way of a network 105. Network 105 may be a local area network, a public network such as the Internet, or a combination thereof.

Cryptographic services (namely data encryption and decryption) for end users of the cryptosystem 100 are provided by a cryptographic application 127 that executes on the end user's computer. Cryptographic services could also be provided by an application that executes on a remote server.

End user computer 125 may be any computer processing system which is configured (or configurable) by hardware and/or software to execute the cryptographic application 127 as described herein. By way of example, the end user computer 125 may be a desktop computer, laptop computer, netbook computer, tablet computing device, mobile/smart phones, personal digital assistants, and other computer device/system.

While only one end user computer 125 is illustrated, cryptosystem 100 typically includes many end user computers, each of which executes an instance of the cryptographic application 127.

Cryptographic application 127 may run as a web application that is hosted by the cloud storage service or other remote application server. In this case, the cryptographic application 127 is implemented in a scripting language (such as Javascript) that is executed by a general web browser application (such as, for example, Chrome, Safari, Internet Explorer, Opera). The cryptographic application 127 is retrieved from the cloud storage service 102/application server via an appropriate uniform resource locator (URL). Communications between the cryptographic application 127 and cloud storage service 102/cryptographic service 130 are by way of general http methods.

Alternatively, cryptographic application 127 may run as an application directly on the end user computer 125. According to this embodiment, cryptographic application 127 is written in a suitable high-level programming language (such as Java), built, and installed on the user computer 125.

In either embodiment, the source code for cryptographic application includes defined application programming interface (API) calls that implement the cryptographic routines described below.

The cryptographic application 127 provides cryptographic services to an encrypting application 129 and a decrypting application 131, each of which typically also executes on the user computer 125. Although illustrated as separate applications, the functions of the cryptographic application 127, encrypting application 129 and decrypting application 131 could also be combined into a single application. The encrypting application 129 and decrypting application 131 could also comprise a single application that stores and retrieves data and/or resources locally, or in the cloud storage service.

The cryptographic application 127 maintains a pool of encryption materials 133. As discussed further below, encryption materials are materials that the cryptographic application 127 uses to encrypt and decrypt data. Typically, encryption materials include plaintext and encrypted data keys and/or logical entities that identify or represent those keys. Some categories of encryption material are generated at the KMSs 110, 115 and 120 and provided to other participants in the cryptosystem 100.

The cryptographic application 127 also stores cryptographic materials in a decryption cache 135. In addition, decryption cache 135 stores sufficient metadata about the stored data keys to reconstruct encryption materials using selected data keys, if desired. Encrypted data keys and other encryption materials may be stored on a long term basis in decryption cache 135. Cache time is configurable, but is generally around 24 hrs. The content of decryption cache 135 can be re-used across different encrypted payloads in the absence of communications with the KMSs. The content of decryption cache 135 can also be securely exported to other user computers 125 for use thereon in the event that those machines possess the necessary decryption permissions. Data can also be suitably imported into a decryption cache 135 from an external user computer.

A secure export of the decryption cache 135 involves the cryptographic application 127 selecting one of the stored encrypted data keys and producing an export containing: the selected encrypted data key, including any KMS metadata required for a subsequent decryption thereof; other encrypted data keys stored in the decryption cache 135, plus decrypted versions thereof that are re-encrypted using the selected data key; and additional metadata (including a timestamp of the original decryption).

Another instance of the cryptographic application 127 that shares the same KMS permissions can import the exported cache. Importing the cache involves: calling a KMS to perform a decryption of the selected encrypted data key. The import does not proceed if the cryptographic application 127 does not have the necessary permissions required to decrypt the selected encryption key; and using the decrypted data key to decrypt the remaining data keys contained within the export, and inserting them into the local decryption key cache if their original decryption timestamp is more recent than the local decryption cache maximum age cut-off.

The pool of encryption materials 133 supports time-to-live (TTL) and usage count limits for the encryption materials stored therein. Encryption materials for which relevant limits have been reached are not immediately discarded, but instead remain in use until replacement encryption materials are generated using the encryption materials refreshment methodology described below.

The pool of encryption materials 133 also supports targeted (rather than random) selection of encryption materials. As described below, this can improve hit rates for cryptographic materials stored in decryption cache 135.

Encryption Materials

Figure 2:
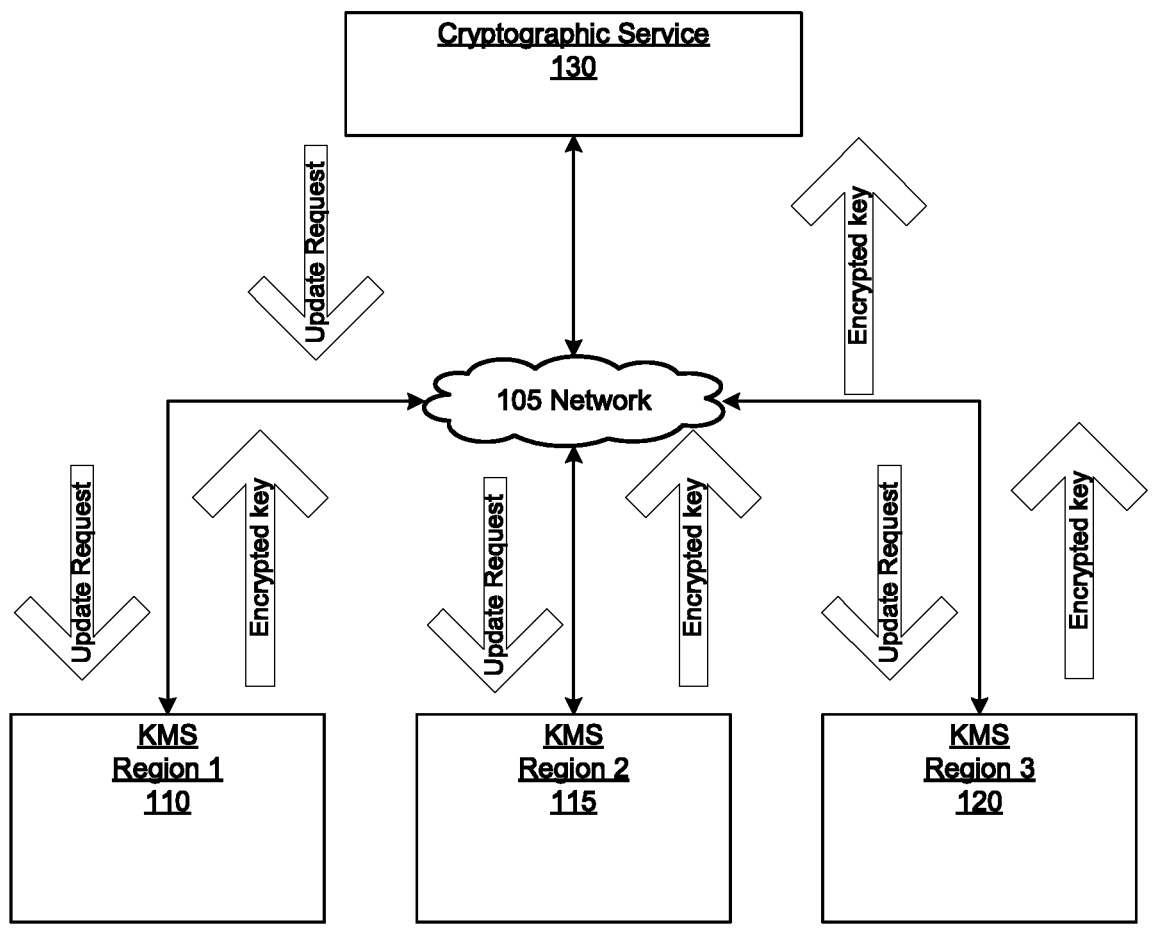
FIG. 2 is a block diagram depicting certain communications occurring within the cryptosystem illustrated in FIG. 1.
Figure 3:
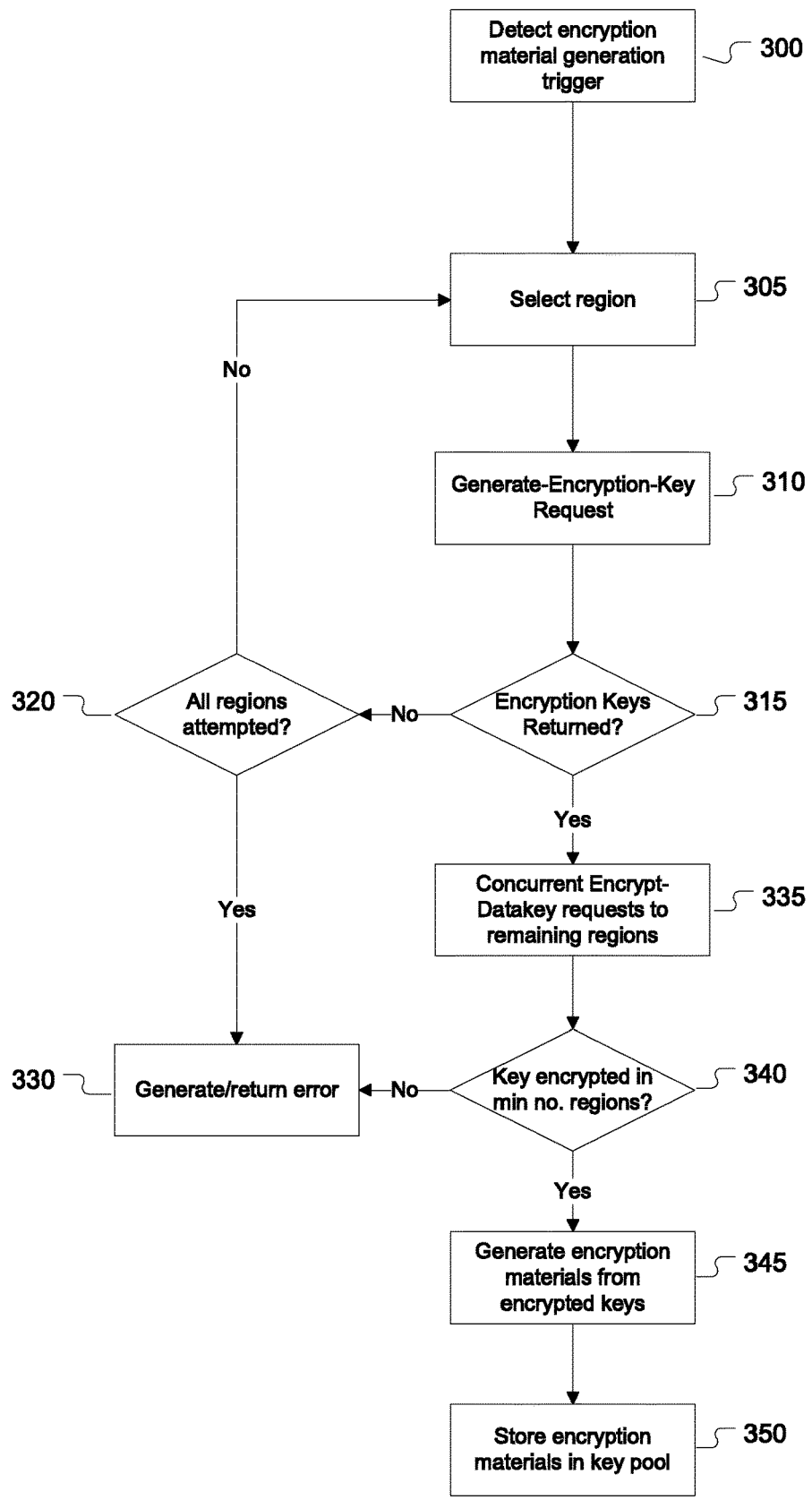
FIG. 3 is a flowchart depicting operations involved in generating encryption materials for use in the cryptosystem illustrated in FIG. 1.

An embodiment of the maintenance of the pool of encryption materials 133 is illustrated by reference to FIGS. 2 and 3. In the illustrated embodiment, the pool of encryption materials 133 is initially seeded after the first encryption request from an encrypting application 129 (see below). Predicating an initial seeding on receipt of an encryption request is performed to avoid unintended consequences that can arise on the start-up of the cryptographic application 127 due to factors such as incorrectly configured or created encryption keys.

In some cases, an initial seeding takes longer than subsequent requests to refresh the pool of encryption materials 133, and in some instances can be unsuccessful due to a failure of one or more KMSs 110, 115, 120. However, as described below, due to the robust encryption material refreshment regime of the present disclosure, subsequent refreshment requests are fulfilled with little latency and are not substantially impacted by KMS failures.

Maintaining the pool of encryption materials 133 involves the cryptographic application 127 running a background task to periodically evaluate the health of at least some of the encryption materials present in the pool of encryption materials 133. As discussed in further detail below, the health of encryption materials is evaluated by reference to one or more health parameters. For each item of encryption material found not to be healthy, cryptographic application 127 issues a request to one or more of the KMSs 110, 115, 120. The request is typically a generate-data-key request that includes a call to a defined operation that causes the selected KMS to generate a data key. Those skilled in the art will be well acquainted with such operations.

Upon receipt of a generate-data-key request, the selected KMS 110, 115, 120 executes the operation to generate a data key. The KMS then encrypts the data key using a CMK and returns both keys (i.e. encrypted and non-encrypted) to the requesting cryptographic application 127. As discussed in further detail below, the returned keys are used to build cryptographic materials. These are inserted in the pool of encryption materials 133 either as new materials or as replacements for selected item/s of encryption material.

Cryptographic application-originating requests and responses thereto are further illustrated by reference to FIG. 3. The process commences at step 300 at which the cryptographic application 127 detects a trigger event pertaining to the generation of encryption materials. A variety of events can trigger the need to generate encryption material including: manual user action; a prompt from the background update task; the cryptographic application 127 receiving a request for encryption and/or decryption services; the size of the pool of encryption materials 133; the state of health of one or more items of encryption material in the pool of encryption materials 133; and the state of health of the pool of encryption materials 133 as a whole.

After detection of the trigger event, the cryptographic application 127 selects a region by selecting one of the KMSs 110, 115, 120 (step 305). The selection can be at random, or on the basis of current network traffic conditions (or other data) applying to individual KMSs.

At step 310, the cryptographic application 127 issues a generate-data-key request to the selected KMS.

At step 315, the cryptographic application 127 determines whether the generate-data-key request was successful. In this regard, a successful generate-data-key request is indicated by the cryptographic application 127 receiving a data key and an encrypted version thereof from the selected KMS within a predetermined timeout period.

In the event of a failed generate-data-key request, the method proceeds to step 320, at which the cryptographic application 127 determines whether a generate-data-key request has been issued to all KMS regions. The region selection step 305 is performed again if the generate-data-key request has not been issued to all KMS regions. The cryptographic application 127 generates or returns an error (step 330) in the event that the request has been issued to all KMS regions.

In the event of a successful generate-data-key request, the process proceeds to step 335, at which the cryptographic application 127 concurrently issues encrypt-data-key requests to two or more remaining KMS regions (i.e. apart from the KMS that responded to the generate-data-key request). An encrypt-data-key request is a request to a KMS to encrypt a data key (that is included in the request) and return the encrypted data key to the requesting application. The data key returned to the cryptographic application 127 in response to the generate-data-key request is included in each of the concurrent encrypt-data-key requests. Issuing concurrent requests is desirable in order to apply an overall timeout to all of the encrypt-data-key requests.

At step 340, the cryptographic application 127 determines whether the data key has been encrypted at a predetermined minimum number of KMS regions. This minimum number can be set as a system configuration in the cryptographic application 127. Preferably, a minimum number is specified that is lower than the overall number of KMSs. This is to provide a level of fault-tolerance and multi-region support to the cryptosystem without adversely compromising security. More specifically, the present disclosure allows encryption materials to be created when a minimum quorum of CMKs have been used to encrypt a data key. This is in contrast to some prior art approaches that require assistance from all KMSs that have encrypted a data key before the data key can be used.

In the event of a positive determination (i.e. the data key has been encrypted in a minimum number of KMS regions) the cryptographic application 127 generates encryption materials from the encrypted data keys received from the relevant KMS regions (step 345).

At step 350, the cryptographic application 127 stores the generated encryption materials in the pool of encryption materials 133.

In the event of a negative determination (i.e. the data key was not encrypted at a minimum number of KMS regions, the cryptographic application 127 returns an error (step 335). The encryption material pool update process is performed again when the cryptographic application 127 next detects a trigger event pertaining to the generation of encryption material.

Encryption

Figure 4:
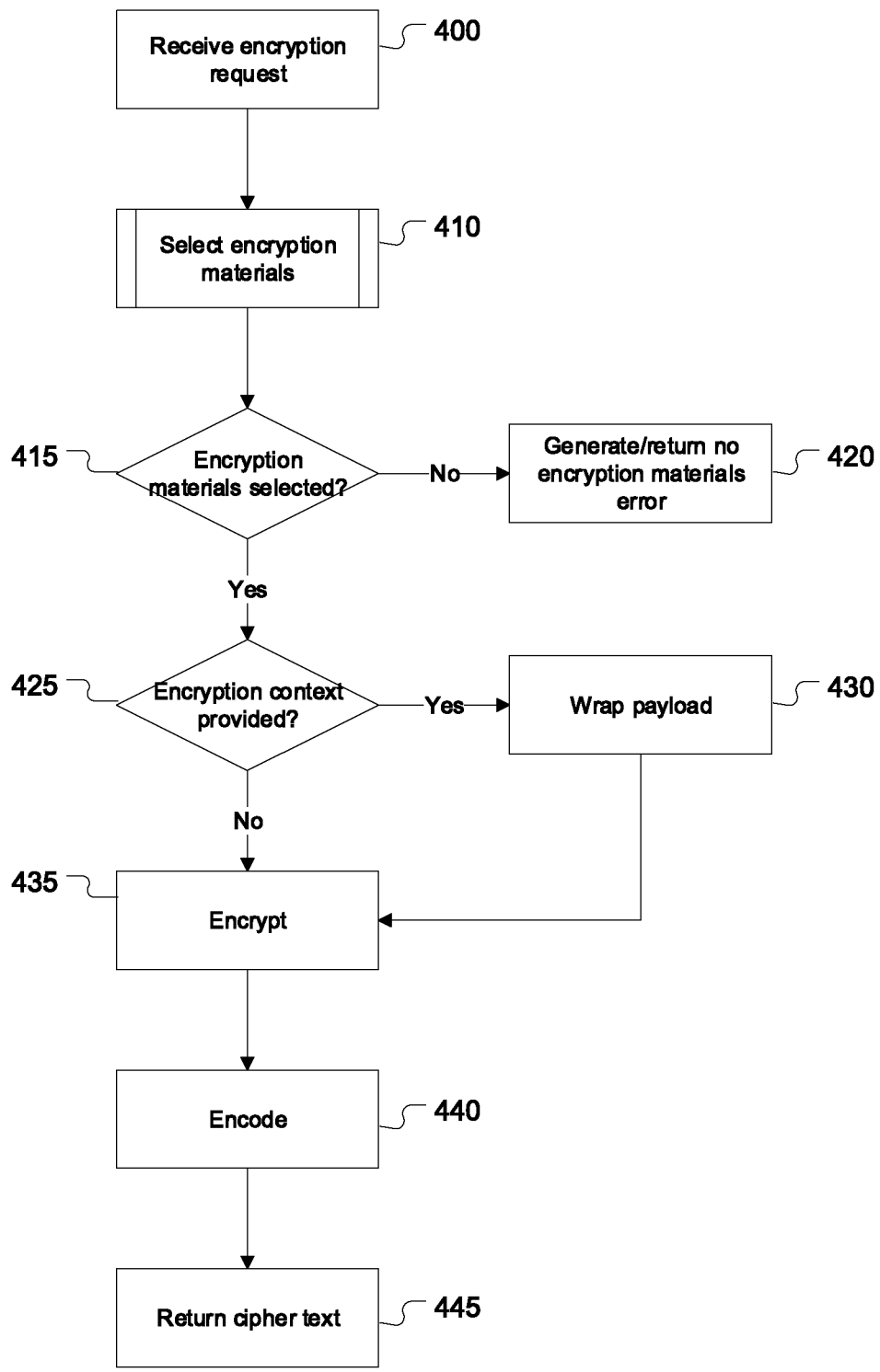
FIG. 4 is a flowchart depicting operations involved in an encryption operation.

An embodiment of the process flows performed by the cryptographic application 127 when providing encryption services to an encrypting application 129 is illustrated by reference to FIG. 4. The process commences at step 400 at which the cryptographic application 127 receives an encryption request from the cryptographic application 127.

Typically, the cryptographic application 127 is configured to utilize one or more encryption key aliases. An encryption key alias is a user-assigned name identifying a CMK in one of the KMSs. Cryptographic application 127 maintains records of encryption key aliases in the pool of encryption materials 133.

An encryption request includes the following parameters: key alia; plaintext payload; optionally an encryption context; and optionally a key sharding string.

At step 410, the cryptographic application 127 selects encryption materials for the key alias submitted in the encryption request. The process of choosing encryption materials is described in greater detail below. The process of choosing encryption materials can be impacted by the inclusion of a key sharding string in the encryption request. As described in greater detail below, key sharding strings are used to deterministically fetch particular encryption material from the pool of encryption materials 133.

At step 415, the cryptographic application 127 determines whether the encryption material selection operation was successful. The cryptographic application 127 returns an error (step 420) to the encrypting application 129 in the event of an unsuccessful selection operation.

At step 425, the cryptographic application 127 determines whether the encryption request includes an encryption context, and in the event of a positive determination, wraps the plaintext payload in a wrapper that contains the desired encryption context and the plaintext payload itself (step 430).

An encryption context is a string that is used to identify the context in which the plaintext payload is encrypted. An included encryption context is cryptographically bound to the encrypted payload such that the same encryption context is required to decrypt the data. Encryption contexts provide an extra level of security that can be useful in guarding against man-in-the-middle type attacks.

At step 435, the cryptographic application 127 encrypts the payload or wrapped payload using the selected encryption materials. Encryption operations provided in programming language libraries and/or software development kits are used to perform the encryption. The result of the encryption is typically an envelope-encrypted payload. The envelope-encrypted payload includes the encrypted payload, along with encrypted version(s) of the data key used to perform the encryption. According to the present disclosure, each encrypted data key returned to the cryptographic application 127 from a KMS is included in the envelope-encrypted payload.

At step 440, the cryptographic application 127 encodes the encrypted payload such as by serialization to a base64 string.

At step 445 the cryptographic application 127 returns the encoded string to the encrypting application 129 as the ciphertext representation of the plaintext payload included in the encryption request.

Those skilled in the art will realize that the processes of determining encryption context submission and payload wrapping can be performed in parallel to the process of encryption material selection.

Selecting Encryption Materials

Figure 5:
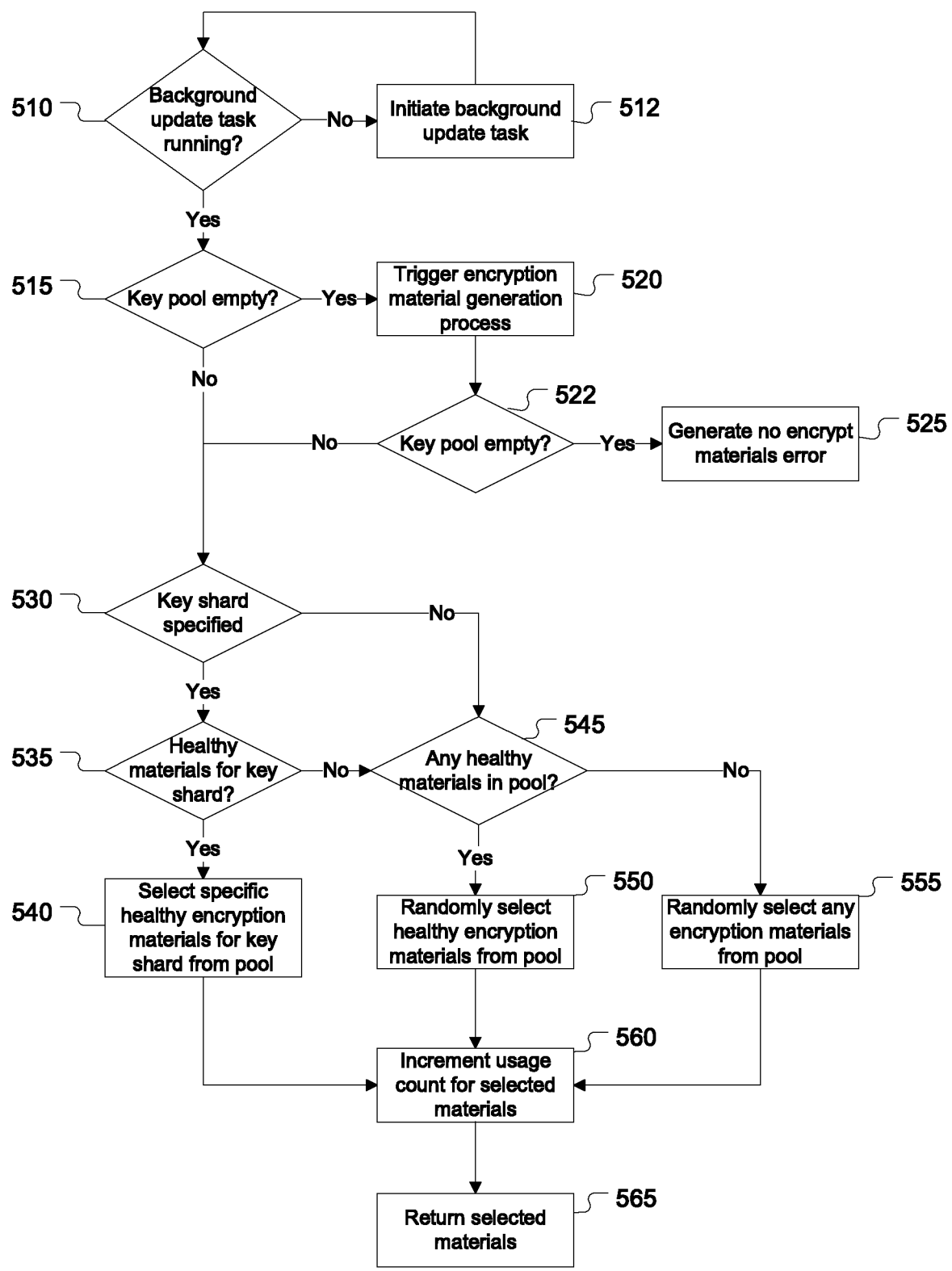
FIG. 5 is a flowchart depicting operations involved in choosing encryption materials.

Step 410 of the encryption process (select encryption materials) is described in greater detail by reference to FIG. 5. The selection process commences at step 510 at which the cryptographic application 127 determines whether the background update task discussed above is executing. The cryptographic application 127 initiates execution of the background update task in the event that it is not running (step 512).

At step 515, the cryptographic application 127 determines whether the pool of encryption materials 133 for the submitted key alias is empty.

In the event of an empty pool, the process triggers the encryption materials generation process described above (step 520). At step 522, the cryptographic application 127 evaluates the success of the encryption material generation process by again determining whether the pool of encryption materials is empty.

The cryptographic application 127 returns a no encryption materials error in the event of an empty pool (step 525).

The process proceeds to step 530 in the event that the pool of encryption materials is not empty (as determined either at step 515 or step 22). At step 530, the cryptographic application 127 determines whether a keyshard was included in the relevant encryption request. If a keyshard was included in the request, the process proceeds to step 535, at which the cryptographic application 127 determines whether there are any healthy encryption materials in the pool of encryption materials 133 that pertain to the included keyshard.

The health of an item of encryption material is evaluated by reference to one or more of the following health parameters: usage count; age; number of encrypted data keys (signifying the number of KMS regions that have encrypted the data key).

The health parameters are configurable from within the cryptographic application. For example, a maximum usage count, maximum age and minimum number of encrypted data keys can be configured. These health parameters are for the purpose of exemplification only and other health parameters could also be used to implement the cryptosystem according to the present disclosure.

If healthy encryption materials pertaining to the keyshard are present in the pool of encryption materials, they are selected by the cryptographic application 127 (step 540).

Returning to step 535, if no keyshard is included in the encryption request, the cryptographic application 127 determines whether there are any healthy encryption materials present in the pool of encryption materials (step 545). The cryptographic application 127 performs this same determination when the result of step 535 is that there are no healthy encryption materials pertaining to a keyshard included in an encryption request.

In the event that healthy encryption materials are present in the pool of encryption materials, the cryptographic application 127 selects from the healthy encryption materials (step 550). Selection may be random. Alternatively, selection may be based on characteristics of the encryption materials, such as the least aged encryption material or the material/s with the lowest usage count.

In the event that there are no healthy encryption materials present in the pool of encryption materials, the cryptographic application 127 selects from the unhealthy encryption materials (step 555). Selection may be random. Alternatively, selection may be based on characteristics of the encryption materials, such as the least aged encryption material or the material/s with the lowest usage count. As noted above, unhealthy encryption materials are not immediately discarded, but instead remain in the pool of encryption materials 133 until they are refreshed by the cryptographic application 127 in a future iteration of the background update task.

Subsequent to the cryptographic application 127 choosing selecting encryption materials pursuant to steps 540, 550 or 555, the process proceeds to step 560 at which the cryptographic application 127 increments the usage count of the selected encryption materials.

The selected encryption materials are returned for use in step 410 of the encryption process discussed above (step 565).

Decryption

Figure 6:
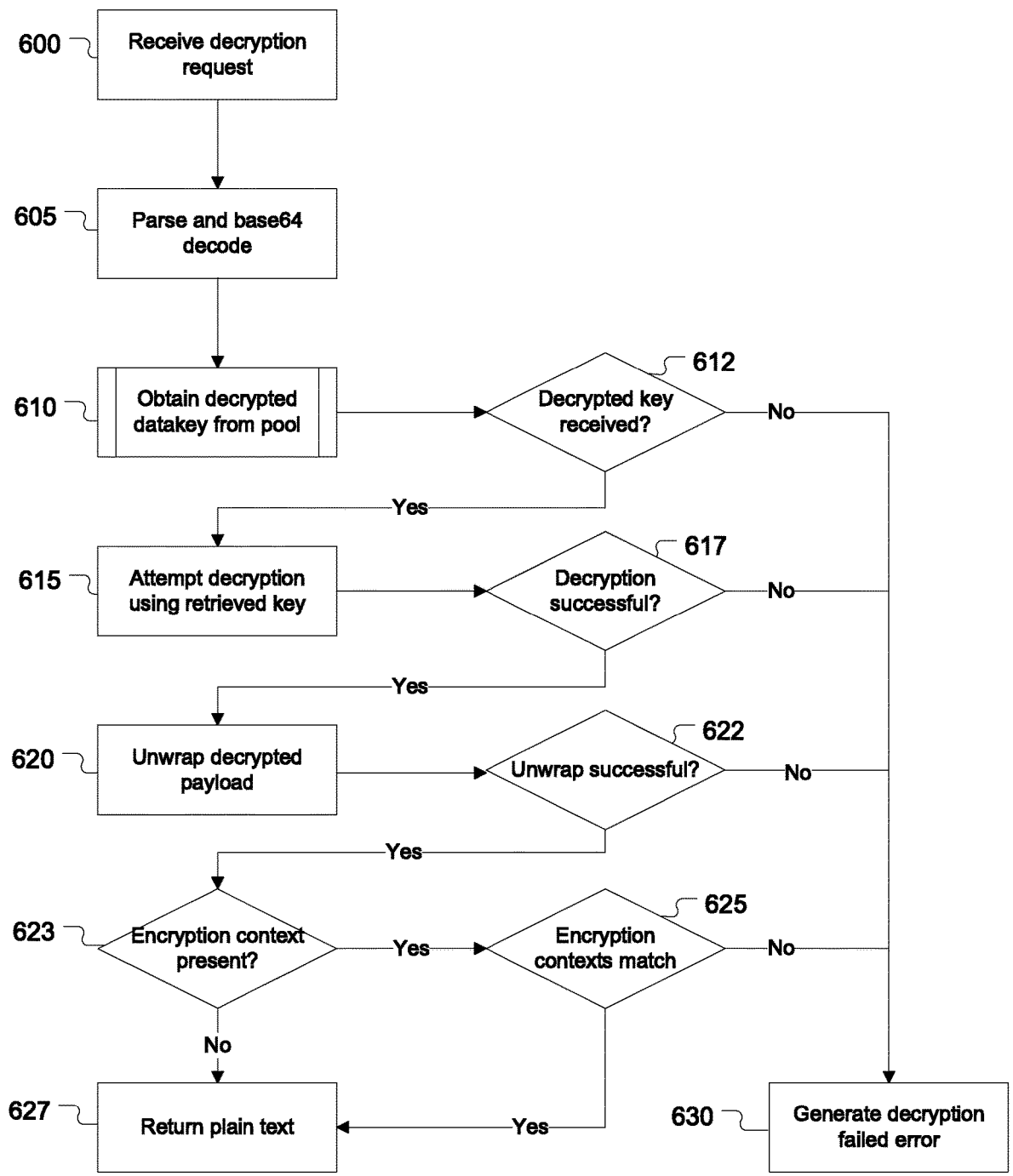
FIG. 6 is a flowchart depicting operations involved in a decryption operation.

An embodiment of the process flows performed by the cryptographic application 127 when providing decryption services to a decrypting application 131 is illustrated by reference to FIG. 6. The process commences at step 600 at which the cryptographic application 127 receives a decryption request from the decrypting application 131. A decryption request typically contains a ciphertext payload and an optional encryption context.

The cryptographic application 127 parses the decryption request and decodes and deserializes the base 64 string to extract the encrypted payload (step 605).

At step 610 the cryptographic application 127 seeks to obtain a decrypted data key from the decryption cache 135.

At step 612, the cryptographic application 127 determines whether it received a decrypted data key. If the cryptographic application 127 receives a decrypted data key, the process proceeds to step 615, at which the cryptographic application 127 utilizes the decrypted data key to attempt decryption of the payload and recovery of the original plaintext.

At step 617, the cryptographic application 127 determines whether the decryption was successful.

In the event of a successful decryption, at step 620, the cryptographic application 127 unwraps the plaintext.

At step 622, the cryptographic application 127 determines whether the unwrapping was successful. In the event of a successful unwrapping, at step 623, the cryptographic application 127 determines whether an expected encryption context is present.

If an expected encryption context is present, at step 625, the cryptographic application 127 performs a verification of the encryption context included in the decryption request against the expected encryption context determined from the wrapper. In the event of a successful verification, the plaintext is returned to the decrypting application 131 (step 627).

If there is no encryption context present in the wrapper, the process proceeds to step 627, at which the plaintext is returned to the decrypting application 131.

The cryptographic application 127 returns an error (step 630) to the decrypting application 131 in the event of failure of any one of steps 612, 617, 622, and 625.

Obtaining Decrypted Data Keys

Figure 7:
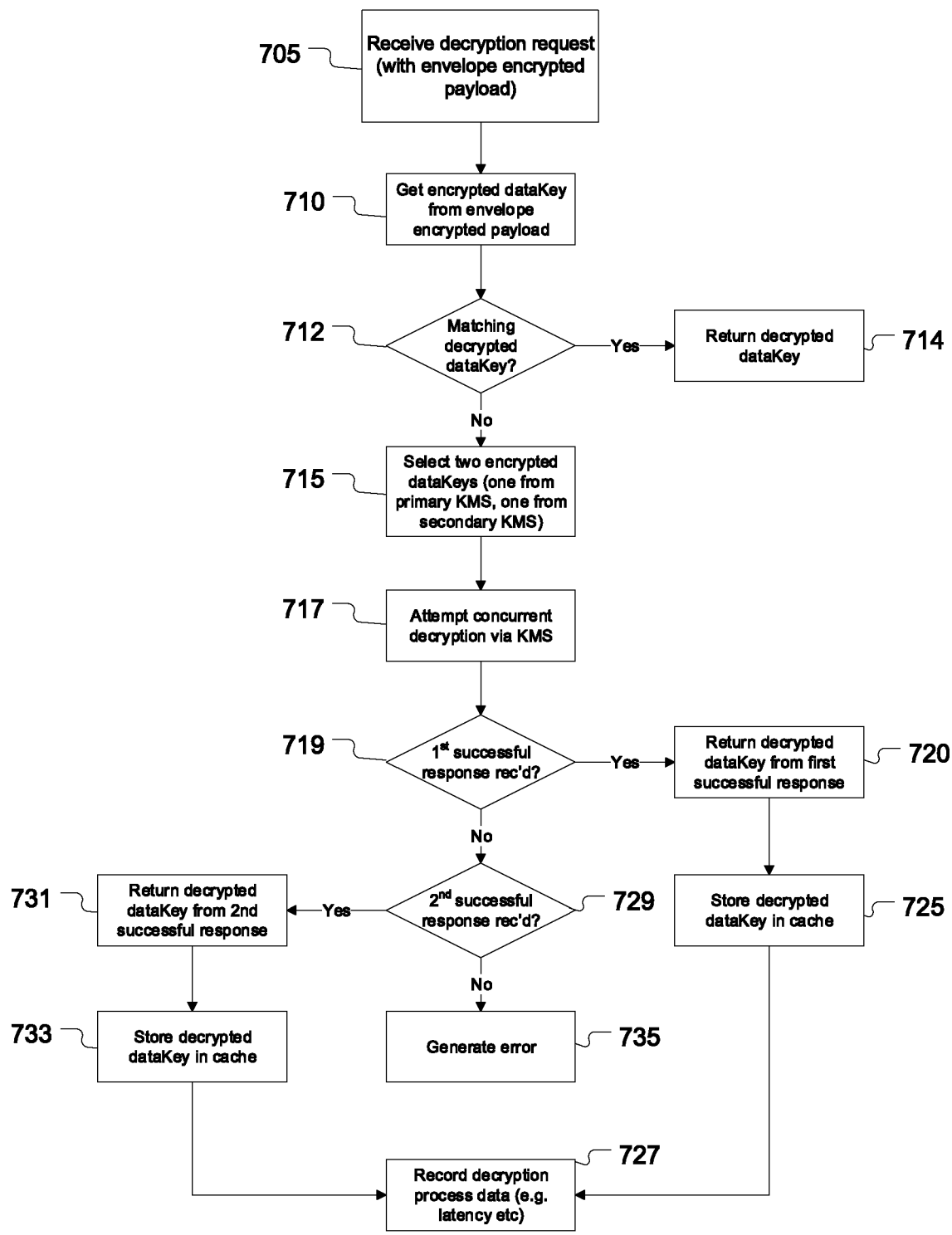
FIG. 7 is a flowchart depicting operations involved in a obtaining a decrypted data key.

Step 610 of the decryption process (obtaining a decrypted data key) is described in greater detail by reference to FIG. 7. The obtaining process is performed in the environment of a KMS selection task that executes on the cryptographic service 130 and periodically evaluates failure rates and latency statistics from all of the KMSs 110, 115 and 120. From the evaluated failure rates and latency statistics, the selection task selects one "primary" KMS and designates the remaining KMSs as "secondary" KMSs.

The obtaining process is performed for each encrypted data key present in the envelope-encrypted payload. The process commences at step 705 at which the cryptographic application 127 receives an obtain-data-key request with an envelope-encrypted payload.

At step 710, the cryptographic application 127 obtains an encrypted data key from the envelope-encrypted payload.

At step 712, the cryptographic application 127 interrogates the decryption cache 135 for a matching decrypted version of the data key. A matched decrypted data key is returned to the cryptographic application 127 for use in the decrypting process (step 714).

In the event that there are no matching decrypted data keys stored in the decryption cache 135, the cryptographic application 127 selects two encrypted data keys (step 715) from those included in the envelope-encrypted payload. The envelope-encrypted payload usually contains multiple encrypted data keys from which to choose. In some cases, the envelope-encrypted payload contains less keys than expected (based on the quorum logic discussed above), and in others (depending on system configuration) contains a single key.

At step 717, the cryptographic application 127 makes concurrent calls to the selected KMSs (i.e. the KMSs at which the selected encrypted data keys were encrypted) to decrypt the encrypted data keys (step 717). The KMSs selected for decryption are selected at random from the envelope-encrypted payload, but with priority given to selecting the current primary KMS if it is available. In some cases, the payload may not contain an encrypted data key for the primary KMS (for example when the underlying data key was not healthy at the time of encryption), and in this scenario the cryptographic application 127 randomly selects two secondary KMSs to perform the decryption.

At step 719, the cryptographic application determines whether it successfully received a first decrypted data key. The cryptographic application 127 returns the first decrypted data key that is received from the two KMSs performing the decryption (step 720).

At step 725, the cryptographic application 127 inserts the decrypted data key into the decryption cache 133 in association with the encrypted version of the data key. Entries in the decryption cache 133 are purged after a system-specified maximum age cut off is reached.

At step 727, the cryptographic application 127 records decryption process data (such as latency).

Optionally, the obtaining process may continue after the time that the cryptographic application 127 receives the first decrypted data key from a KMS. In this embodiment, at step 729, the cryptographic application 127 determines whether it received a second decrypted data key.

If a second decrypted data key has been received, the cryptographic application 127 returns the received key (step 731) and stores the decrypted data key in the decryption cache 135 (step 733).

Step 727 is then performed in respect of the decryption process data generated during decryption of the second decrypted data key.

The cryptographic application 127 generates an error if it does not receive a decrypted data key within a timeout period from any of the KMSs that were performing decryption (step 535).

Computer Processing System

The features and techniques described herein are implemented using one or more computer processing systems. For example, user computer 125 will typically be a computer system such as a desktop computer, laptop computer, smart phone, tablet device or other computer. Cryptographic service 130 and the various services provided by the cloud regions (110, 115, and 120) are also provided by one or more computer systems.

Figure 8:
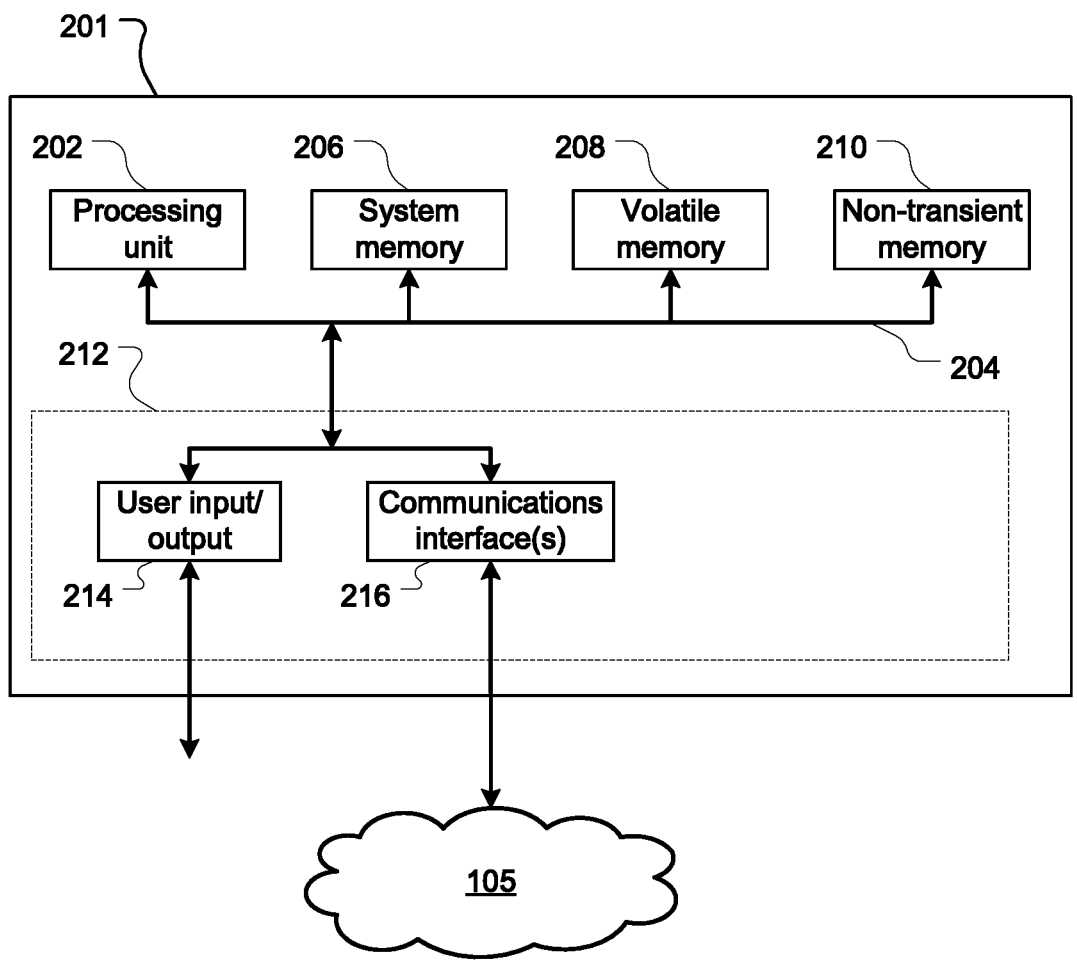
FIG. 8 is a block diagram of a computer processing system configurable to perform various features of the present disclosure.

FIG. 8 provides a block diagram of a computer processing system 200 configurable to implement embodiments and/or features described herein. System 200 is a general purpose computer processing system. It will be appreciated that FIG. 2 does not illustrate all functional or physical work items of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer work items than those depicted.

Computer processing system 201 includes at least one processing unit 202. The processing unit 202 may be a single computer processing device (e.g. a central processing unit, graphics processing unit, or other computational device), or may include a plurality of computer processing devices. In some instances all processing will be performed by processing unit 202, however in other instances processing may also be performed by remote processing devices accessible and useable (either in a shared or dedicated manner) by the system 201.

Through a communications bus 204 the processing unit 202 is in data communication with a one or more machine readable storage (memory) devices which store instructions and/or data for controlling operation of the processing system 200. In this example system 201 includes a system memory 206 (e.g. a BIOS), volatile memory 208 (e.g. random access memory such as one or more DRAM modules), and non-volatile memory 210 (e.g. one or more hard disk or solid state drives).

System 201 also includes one or more interfaces, indicated generally by 212, via which system 201 interfaces with various devices and/or networks. Generally speaking, other devices may be integral with system 201, or may be separate. Where a device is separate from system 201, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 201 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 201 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 201 connects—whether by wired or wireless means—include one or more input devices to allow data to be input into/received by system 201 for processing by the processing unit 202, and one or more output device to allow data to be output by system 201. Example devices are described below, however it will be appreciated that not all computer processing systems will include all mentioned devices, and that additional and alternative devices to those mentioned may well be used.

For example, system 201 may include or connect to one or more input devices by which information/data is input into (received by) system 201. Such input devices may include keyboards, mice, trackpads, microphones, accelerometers, proximity sensors, GPS devices and the like. System 201 may also include or connect to one or more output devices controlled by system 201 to output information. Such output devices may include devices such as a CRT displays, LCD displays, LED displays, plasma displays, touch screen displays, speakers, vibration modules, LEDs/other lights, and such like. System 201 may also include or connect to devices which may act as both input and output devices, for example memory devices (hard drives, solid state drives, disk drives, compact flash cards, SD cards and the like) which system 201 can read data from and/or write data to, and touch screen displays which can both display (output) data and receive touch signals (input).

System 201 may also connect to one or more communications networks (e.g. the Internet, a local area network, a wide area network, a personal hotspot etc.) to communicate data to and receive data from networked devices, which may themselves be other computer processing systems.

System 201 may be any suitable computer processing system such as, by way of non-limiting example, a server computer system, a desktop computer, a laptop computer, a netbook computer, a tablet computing device, a mobile/smart phone, a personal digital assistant, or other computing device/system.

Typically, system 201 will include at least user input and output devices 214 and a communications interface 216 for communication with a network such as network 105 of environment 100.

System 201 stores or has access to computer applications (also referred to as software or programs)—i.e. computer readable instructions and data which, when executed by the processing unit 202, configure system 201 to receive, process, and output data. Instructions and data can be stored on non-transient machine readable medium accessible to system 200. For example, instructions and data may be stored on non-transient memory 210. Instructions and data may be transmitted to/received by system 200 via a data signal in a transmission channel enabled (for example) by a wired or wireless network connection over interface such as 212.

Applications accessible to system 201 will typically include an operating system application such as Microsoft Windows®, Apple macOS, Apple iOS, Android, Unix, or Linux.

System 201 also stores or has access to applications which, when executed by the processing unit 202, configure system 201 to perform various computer-implemented processing operations described herein.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, work items, integers, steps, or elements.

The present disclosure uses terms "first," "second," etc. to describe various elements. Absent other context/requirements, however, these terms are used to distinguish different elements or features from one another and not in an ordinal sense. For example, absent other context/requirements use of first and second in respect of a first user interaction and a second user interaction does alone indicate any order or precedence: absent other context/requirements, the first user interaction could occur before or after the second user input. Furthermore, reference to a 'first' element or feature does not necessarily imply there must be a second element or feature (e.g. use of the word 'first' in 'a first user input' does not alone imply that there must be a second user input).

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer implemented method for managing a cryptographic service, comprising:
    establishing a pool of encryption materials comprising multiple encryption keys and encrypted versions thereof;
    periodically updating the pool of encryption materials, updating the pool of encryption materials comprising:
    making a first update request to a first external cryptographic key service;
    responsive to the first update request, receiving an encryption key and a first encrypted version of the encryption key;
    making a second update request to a second external cryptographic key service distinct from the first external cryptographic key service, the second update request comprising the encryption key; and
    responsive to the second update request, receiving a second encrypted version of the encryption key that is different than the first encrypted version of the encryption key;
    responsive to an encryption request from an encrypting application:
    selecting a subset of encryption materials from the pool of encryption materials;
    encrypting payload data included in the encryption request using the selected subset of encryption materials; and
    returning encrypted payload data to the encrypting application; and
    maintaining health parameters of the encryption materials in the pool of encryption materials, the health parameters including, for the encryption key:
        a number of times the encryption key has been used to encrypt payload data;
        an age of the encryption key; and
        a number of encrypted versions of the encryption key.

2. A computer implemented method according to claim 1, wherein the periodic updating further comprises:
    making a third update request to a third external cryptographic key service that is distinct from the first external cryptographic key service and distinct from the second external cryptographic key service, the third update request including the encryption key; and
    responsive to the third update request, receiving a third encrypted version of the encryption key.

3. A computer implemented method according to claim 2, wherein the second and third update requests are made concurrently.

4. A computer implemented method according to claim 2, further comprising:
    making one or more additional update requests each to distinct additional external cryptographic key services, each update request including the encryption key; and
    receiving a respective encrypted version of the encryption key from each respective additional external cryptographic key service.

5. A computer implemented method according to claim 1, wherein the selecting comprises selecting the subset of encryption materials by reference to one of more of the health parameters.

6. A computer implemented method according to claim 1, wherein an encryption material remains in the pool of encryption materials notwithstanding that the encryption material does not meet a prescribed health parameter.

7. A computer implemented method according to claim 6, wherein the selecting the subset of encryption materials comprises selecting from encryption materials that do not meet a prescribed health parameter in the event that there are no encryption materials present in the pool of encryption materials that meet a prescribed health parameter.

8. A computer implemented method according to claim 1, wherein the encryption request includes an encryption parameter and the selecting the subset of encryption materials comprises selecting encryption material by reference to the encryption parameter.

9. A computer implemented method according to claim 8, wherein the encryption parameter includes an identifier to the first external cryptographic key service.

10. A computer implemented method according to claim 1, wherein encrypting the payload data comprises:
    encrypting the payload data with the encryption key;
    associating the first encrypted version of the encryption key with the encrypted payload data; and
    associating the second encrypted version of the encryption key with the encrypted payload data.

11. A non-transient computer-readable storage medium storing sequences of instructions, which when executed by a processor, cause the processor to:
    establish a pool of encryption materials comprising multiple encryption keys and encrypted versions thereof;
    periodically update the pool of encryption materials, updating the pool of encryption materials comprising:
    making a first update request to a first external cryptographic key service;
    responsive to the first update request, receiving an encryption key and a first encrypted version of the encryption key;
    making a second update request to a second external cryptographic key service distinct from the first external cryptographic key service, the second update request comprising the encryption key; and
    responsive to the second update request, receiving a second encrypted version of the encryption key that is different than the first encrypted version of the encryption key;
    responsive to an encryption request from an encrypting application:
    select a subset of encryption materials from the pool of encryption materials;

encrypt payload data included in the encryption request using the selected subset of encryption materials; and return encrypted payload data to the encrypting application; and maintain health parameters of the encryption materials in the pool of encryption materials, the health parameters including:

a number of times the encryption key has been used to encrypt payload data;

an age of the encryption key; and a number of encrypted versions of the encryption key.

12. A non-transient computer-readable storage medium according to claim 11, wherein the periodic updating further comprises:

making a third update request to a third external cryptographic key service that is distinct from the first external cryptographic key service and distinct from the second external cryptographic key service, the third update request including the encryption key; and responsive to the third update request, receiving a third encrypted version of the encryption key.

13. A non-transient computer-readable storage medium according to claim 12, wherein the second and third update requests are made concurrently.

14. A non-transient computer-readable storage medium according to claim 13, wherein the sequences of instructions further cause the processor to:

make one or more additional update requests each to distinct additional external cryptographic key services, each update request including the encryption key; and receive a respective encrypted version of the encryption key from each respective additional external cryptographic key service.

15. A non-transient computer-readable storage medium according to claim 11, wherein the selecting comprises selecting the subset of encryption materials by reference to one of more of the health parameters.

16. A non-transient computer-readable storage medium according to claim 15, wherein an encryption material remains in the pool of encryption materials notwithstanding that the encryption material does not meet a prescribed health parameter.

17. A non-transient computer-readable storage medium according to claim 16, wherein the selecting the subset of encryption materials comprises selecting from encryption materials that do not meet a prescribed health parameter in the event that there are no encryption materials present in the pool of encryption materials that meet a prescribed health parameter.

18. A non-transient computer-readable storage medium according to claim 11, wherein the encryption request includes an encryption parameter and the selecting the subset of encryption materials comprises selecting encryption material by reference to the encryption parameter.

19. A non-transient computer-readable storage medium according to claim 18, wherein the encryption parameter includes an identifier to the first external cryptographic key service.

20. A computer processing system for managing a cryptographic service comprising:

a processing unit;

a communication interface; and a non-transient computer-readable storage medium storing sequences of instructions, which when executed by a processor, cause the processor to:

establish a pool of encryption materials comprising multiple encryption keys and encrypted versions thereof;

periodically update the pool of encryption materials, updating the pool of encryption materials comprising:

making a first update request to a first external cryptographic key service;

responsive to the first update request, receiving an encryption key and a first encrypted version of the encryption key;

making a second update request to a second external cryptographic key service distinct from the first external cryptographic key service, the second update request comprising the encryption key; and responsive to the second update request, receiving a second encrypted version of the encryption key that is different than the first encrypted version of the encryption key;

responsive to an encryption request from an encrypting application:

select a subset of encryption materials from the pool of encryption materials;

encrypt payload data included in the encryption request using the selected subset of encryption materials; and return encrypted payload data to the encrypting application; and maintain health parameters of the encryption materials in the pool of encryption materials, the health parameters including:

a number of times the encryption key has been used to encrypt payload data;

an age of the encryption key; and a number of encrypted versions of the encryption key.

* * * * *